United States Patent [19]
Tveit

[11] Patent Number: 4,870,626
[45] Date of Patent: Sep. 26, 1989

[54] METHOD FOR DETERMINING THE POSITION OF A MARINE SEISMIC RECEIVER CABLE

[75] Inventor: Egil Tveit, Sandnes, Norway

[73] Assignee: Den norske stats oljeselskap a.s, Stavanger, Norway

[21] Appl. No.: 27,120

[22] Filed: Mar. 16, 1987

Related U.S. Application Data

[63] Continuation of Ser. No. 601,060, Apr. 16, 1984, abandoned.

[30] Foreign Application Priority Data

Apr. 29, 1983 [NO] Norway .................................. 831513

[51] Int. Cl.$^4$ ................................................ G01V 1/38
[52] U.S. Cl. ........................................ 367/130; 367/6; 367/19
[58] Field of Search ..................... 367/19, 106, 130, 6; 114/242

[56] References Cited

U.S. PATENT DOCUMENTS

| | | |
|---|---|---|
| 3,831,136 | 8/1974 | Sagoci . |
| 3,953,827 | 4/1976 | Le Moal et al. ....................... 367/19 |
| 4,063,213 | 12/1977 | Itria et al. . |
| 4,087,780 | 5/1978 | Itria et al. . |
| 4,231,111 | 10/1980 | Neeley ............................... 367/106 |

FOREIGN PATENT DOCUMENTS

| | | |
|---|---|---|
| 2631634 | 1/1977 | Fed. Rep. of Germany . |
| 7316244 | 12/1973 | France . |
| 7306123 | 9/1974 | France . |
| WO84/03153 | 8/1984 | PCT Int'l Appl. . |
| 1090428 | 11/1967 | United Kingdom . |
| 1285769 | 8/1972 | United Kingdom . |
| 1394533 | 5/1975 | United Kingdom . |
| 1552712 | 10/1979 | United Kingdom . |
| 2047406 | 11/1980 | United Kingdom . |
| 2089042 | 6/1982 | United Kingdom . |
| 2089043 | 6/1982 | United Kingdom . |
| 2113391 | 8/1983 | United Kingdom . |
| 2128328 | 4/1984 | United Kingdom . |

OTHER PUBLICATIONS

Streamer Positioning Field Test, Project Report Streamer Positioning Test, Jan. 1983.
Simrad Manual, 2nd Edition, Sep. 1982.

Primary Examiner—Thomas H. Tarcza
Assistant Examiner—Daniel T. Pihulic
Attorney, Agent, or Firm—Foley & Lardner, Schwartz, Jeffery, Schwaab, Mack, Blumenthal & Evans

[57] ABSTRACT

A method for determining the position of a marine seismic receiver cable of the type which is towed behind a seismic survey vessel through the sea, wherein the azimuth and the distance from the vessel to points along the seismic receiver cable are measured, and the coodinates of these points are calculated on the basis of these values. A hydroacoustic measurement method is utilized, based on a super-short baseline system integrated with a gyrocompass, for measuring the azimuth and distances in accordance with signals from transponders, beacons, responders and/or similar instruments installed on or within the seismic receiver cable.

3 Claims, 5 Drawing Sheets

METHOD FOR DETERMINING THE POSITION OF A MARINE SEISMIC RECEIVER CABLE

This application is a continuation, of application Ser. No. 601,060, filed Apr. 16, 1984, now abandoned.

The present invention relates to a method for determining the position of a marine seismic receiver cable.

In order to appreciate the background and objects of the invention, the drawings will be referred to throughout the specification, wherein.

Figure 4A:
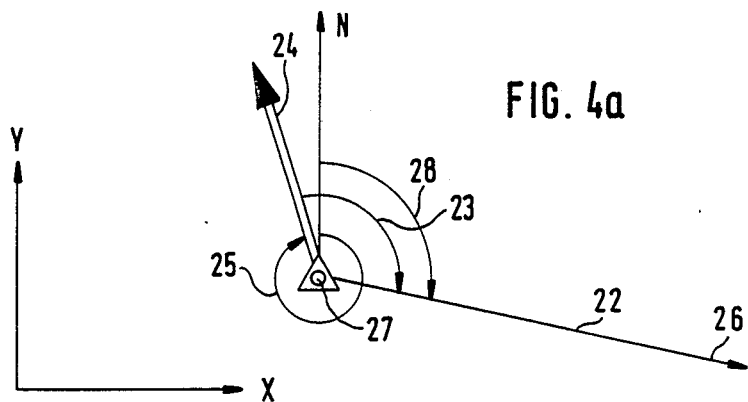
FIG. 4a is a schematic view of direction and angle calculations using polar measurement.
Figure 4B:
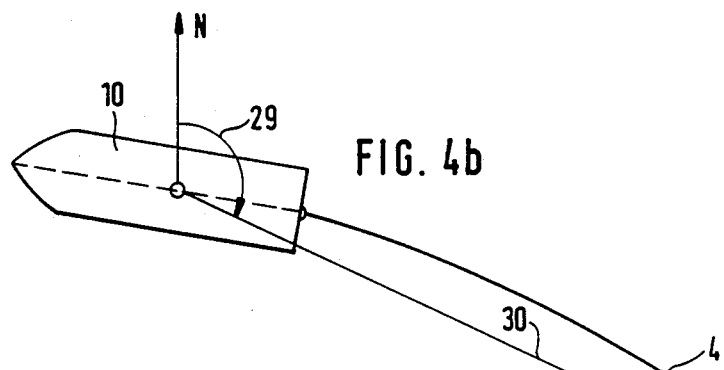
Figure 5:
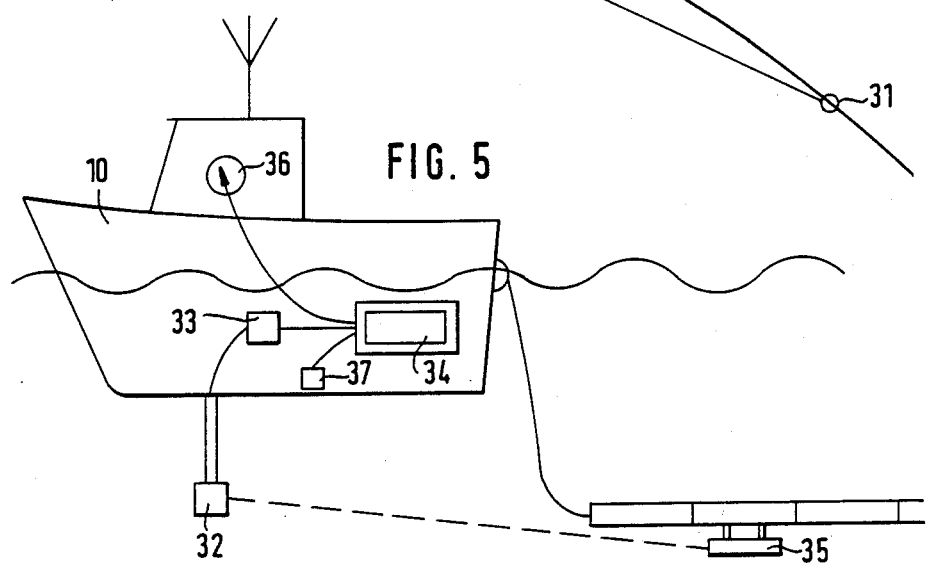
Figure 6:
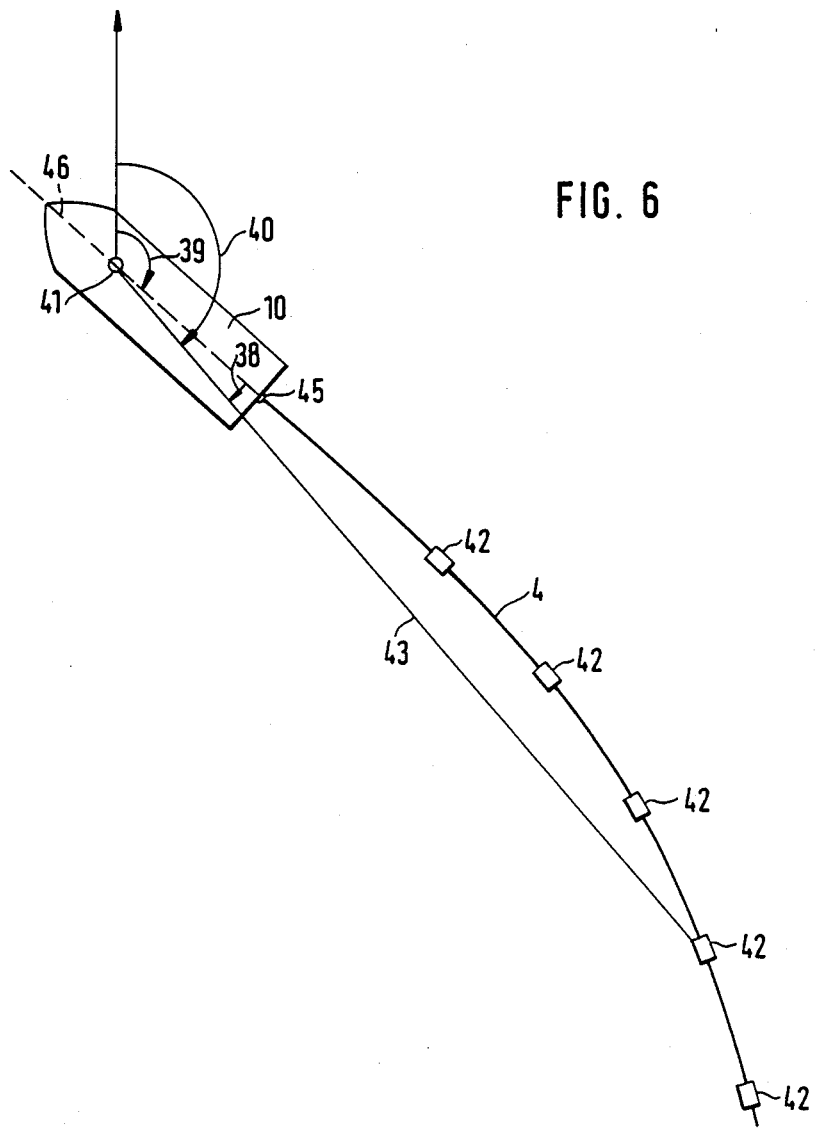
Figure 7A:
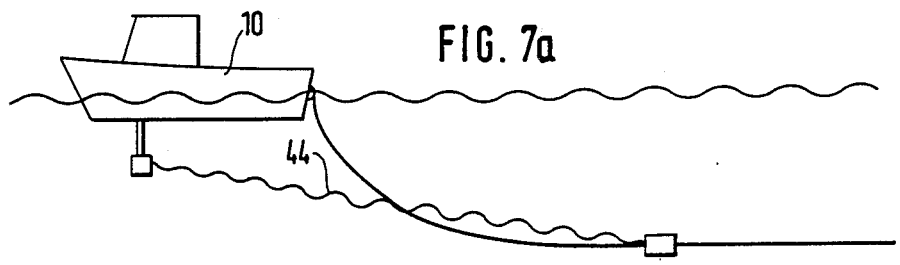
Figure 7B:
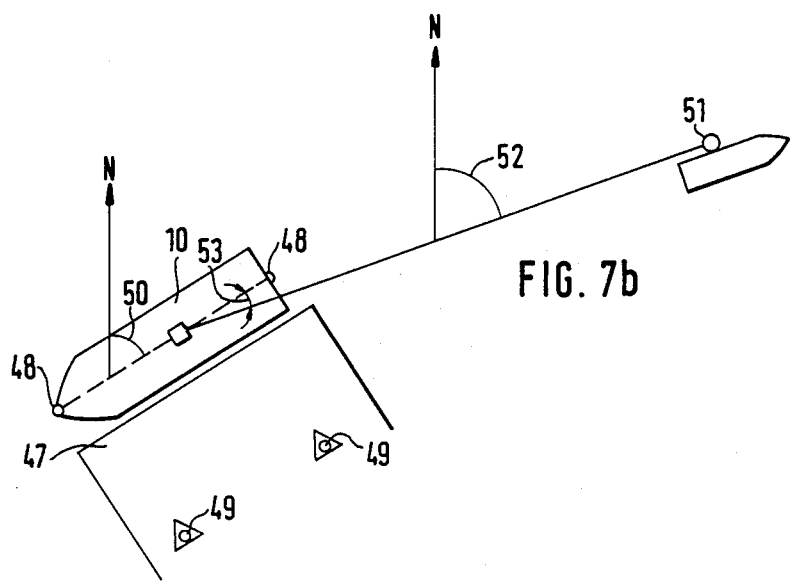

FIG. 4b schematically illustrates use of the polar measurement method with a vessel;

FIG. 5 is a schematic view of a vessel and transducer/transponder means;

FIG. 6 is a schematic plan view of the vessel and measuring points;

FIG. 7a illustrates the beam path from transponder to transducer;

FIG. 7b illustrates a calibration system; and

Figure 8:
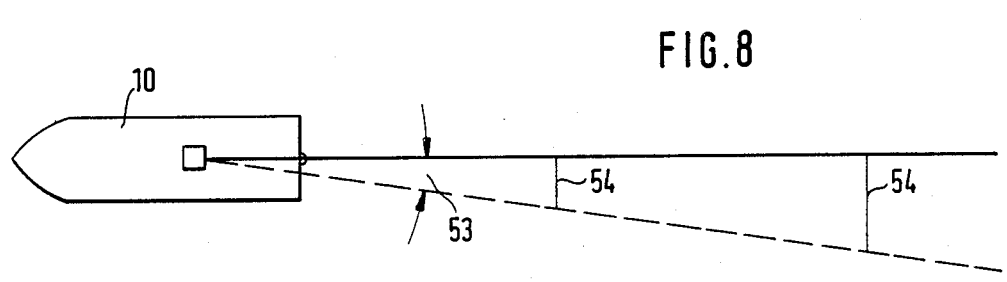

FIG. 8 shows the calculation transverse errors.

Figure 1:
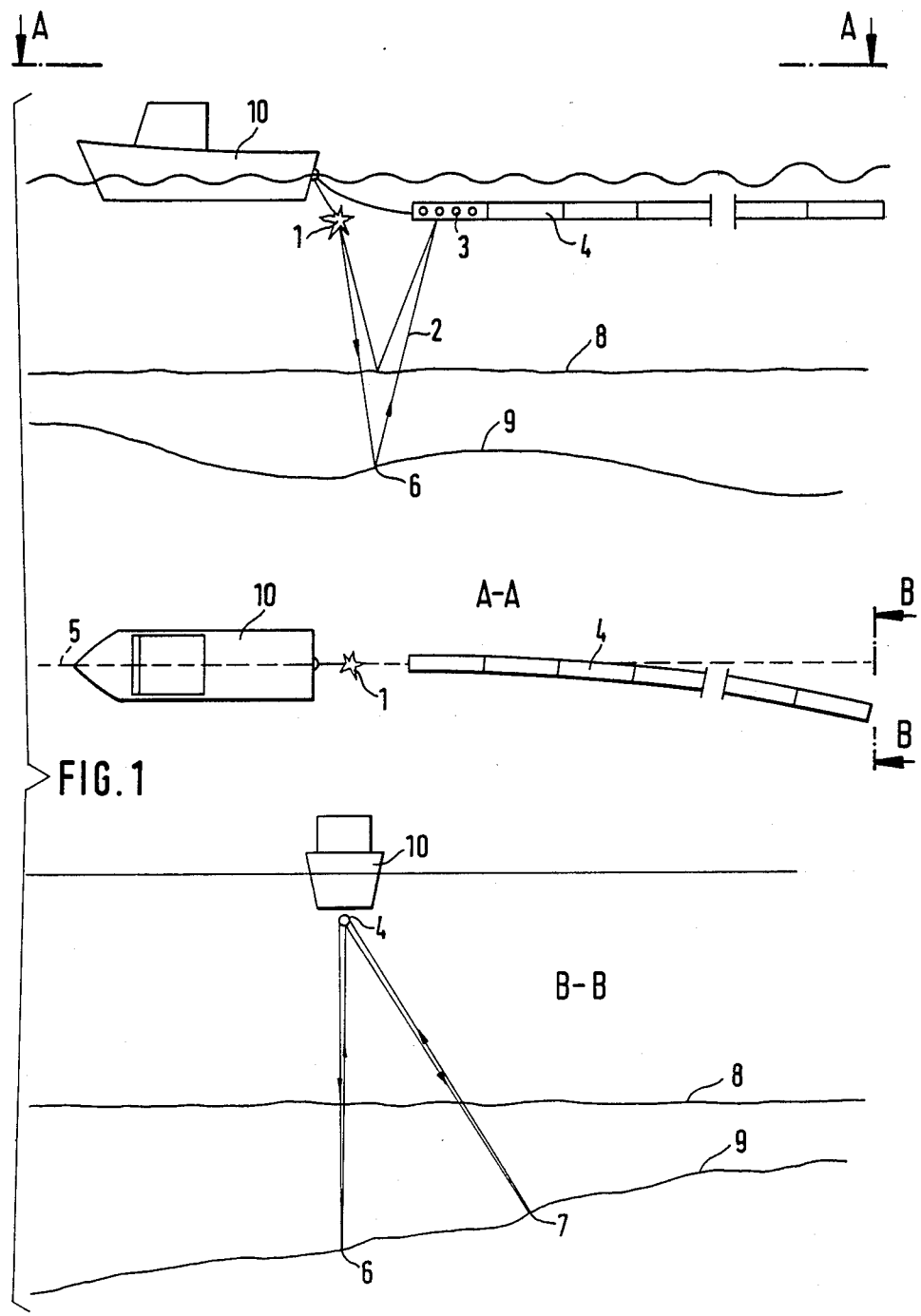
FIG. 1 illustrates schematic, side, plan and end views of a seismic survey of a sea bed.

In seismic surveys of the sea bed (see FIG. 1), pulses of energy 1 are released into the water by means of air guns or other methods ("shots"). The signals are reflected 2 from the sea bed 8 and substrata 9 and are detected by groups of hydrophones 3 on the receiver cable. The length of the receiver cable is typically 2400–3000 meters, divided into hydrophone groups typically 25 meters long.

In conventional seismic surveys (known as two-dimensional surveys, or simply 2-D), it is assumed that the seismic receiver cable extends on a straight line behind the towing vessel 10 (the seismic vessel), and that it follows the same course 5 as that along which the vessel sails. It is further assumed that the reflected signals 2 originate from points 6 lying on a vertical plane through the cable 4.

These assumptions are incorrect, for two reasons. First, the cable does not necessarily extend on a straight line behind the vessel, owing to ocean currents or because the vessel is not sailing along a straight line (steering effects). Secondly, the geology of the area being investigated may cause reflections to originate also from points 7 that lie outside a vertical plane through the cable.

For detailed seismic surveys of regions with complicated geology, the actual points of reflection for the recorded data must be determined. This is done by means of the extremely complicated surveying technique known as three-dimensional surveying (3-D). This technique, which requires processing a huge quantity of data, is possible today with the aid of modern computers.

In a 3-D survey, the course lines are plotted very densely, typically 50–75 meters, and the location of each separate hydrophone group on the receiver cable when the reflected signals are received is taken into account in the calculations. This means that the position of each individual hydrophone group must be known for each shot.

Figure 2:
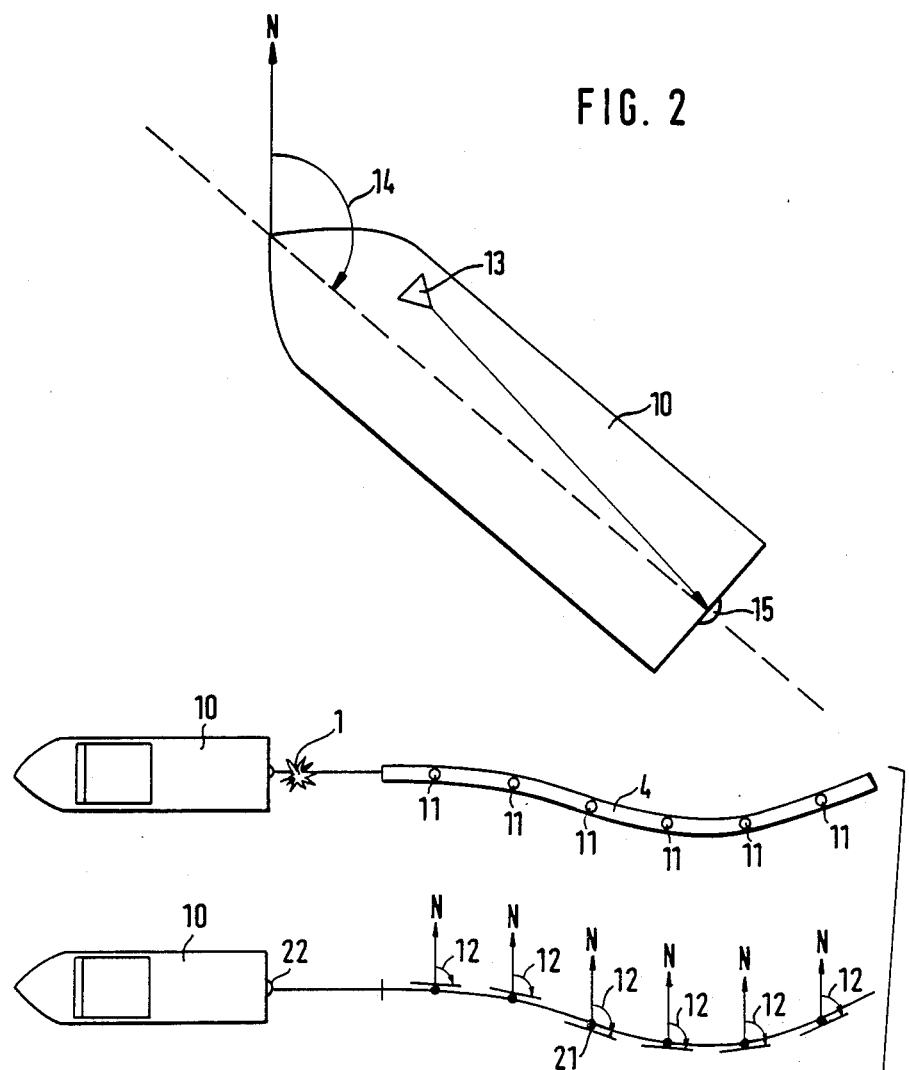
FIG. 2 is a schematic plan view of a vessel.

In the following description of methods for determining the position of the receiver cable, it is assumed that the position of the seismic vessel's navigation antenna 13 is known (FIG. 2), and that the vessel is equipped with a gyrocompass 14 such that the position of other points 15 on the vessel can be determined from the position of the navigation antenna 13.

It is also assumed that by position, one means the coordinates of one point with reference to a geographic system of coordinates for longitude and lattitude, or right-angle coordinates (x, y) on a map projection. For operations on the Norwegian Continental Shelf, European Data 1950 and the UTM projection will be utilized.

Figure 3:
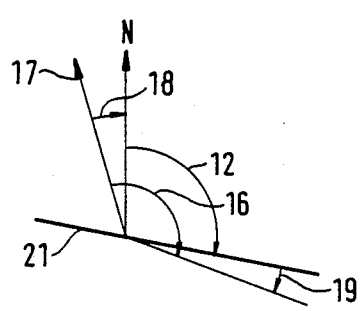
FIG. 3 is a schematic view of the vessel and compass readings.

The system which today is used almost exclusively for determining the position of seismic receiver cables utilizes small, high-precision magnetic compasses (see FIG. 3). A plurality of such magnetic compasses 11, typically six to twelve, are mounted in the acoustic receiver cable 4. These compasses 11 have built-in digital angle reading capability and are connected through the receiver cable to read-out equipment on board the seismic vessel.

The shape of the cable is approximated by a mathematical curve which has a fixed point at the tow point 22 on the vessel, the boundary conditions being that the curve's tangent direction 21 at the points corresponding to the compass locations is equal to the azimuth 12 (the angle relative to geographic north) at these points. After the mathematical curve has been computed, one can calculate the position of each separate group of hydrophones 3 on the receiver cable. This is normally done for each shot. The measurements made with the magnetic compasses are referenced to the magnetic North Pole 17. To arrive at the azimuth 12, one must correct for the difference between magnetic north and geographic north, the deviation 18. The deviation is specified on sea charts, but to obtain the desired accuracy one must determine the deviation in the actual region being surveyed. Moreover, the compasses may have systematic errors 19 which also must be computed and taken into account when calculating the azimuth. Practical experience has shown that the corrections that have to be made for deviation and systematic errors will vary with the course direction, therefore requiring that calibration of the system be done extremely carefully.

To calibrate the system, the vessel sails in different directions and compass readings are taken. It is assumed a priori that this is done when there are no appreciable ocean currents, or when the currents are equally strong but oppositely directed, etc. By statistical analysis of the data, therefore, one can obtain the corrections. Since conditions when calibration is being performed will not be quite as assumed, for example owing to wind-induced currents, etc., the corrections will not be entirely accurate. This error will be propagated systematically when the correction factors are applied to the readings. The accuracy of the azimuth will be on an order of magnitude of ±1 degree.

It should be noted in connection with the magnetic compass method that the position of points on the cable is not measured directly. The positions are computed indirectly via the mathematical curve that is determined by the tangent boundary conditions. It is therefore difficult to quantify the accuracy obtainable with this method, but an accuracy to within about 25–50 meters at the rearmost parts of the cable is suggested by companies that have used the method.

The use of magnetic compasses for determining the position of the receiver cable assumes that the magnetic field in the survey region is stable as far as direction is concerned. At high latitudes, as for example in Northern Norway, the magnetic field will vary both in strength and direction owing to magnetic storms. The changes in direction can amount to several degrees in a short period of time, which renders the use of magnetic compasses for determining the cable position unsuitable in these regions.

A polar measurement system, in accordance with the invention, means that a distance 22 and angle 23 are measured in relation to a direction of reference 24 (FIG. 4a). The azimuth 25 of the reference direction is known. The position of a new point 26 can then be calculated in relation to the known point 27 by decomposing the measured distance 22 into its x and y components by calculating the azimuth 28 of the line from the known point to the new point.

To use the polar measurement principle for determining the position of seismic receiver cables, the azimuth 29 and the distance 30 from the tow vessel to points 31 on the cable are measured (FIG. 4b).

The seismic cable is towed at a depth of typically 5–20 meters, and it is therefore necessary to perform measurements through the water. A super-short baseline hydroacoustic measuring system is used to do this, i.e., the angles are measured in relation to a baseline on the order of 10 cm, while the measured distances may be up to about 300,000 cm.

Super-short baseline hydroacoustic measuring systems are commercially available, for example the Simrad HPR system, and will not be described further in this specification. It should be mentioned, however, that the main components of the system (FIG. 5) are a transducer 32 ("measuring head") which can be submersed 3–4 meters below the bottom of the vessel, various electronic controls 33, and a readout unit 34 which gives the distance and angle. The measuring head must be mounted such that angles can be measured in relation to the vessel's centerline or some other line of reference. The use of the system by "hanging it over the side of the ship" will not work. Furthermore, there must be a device 35 with which the measuring head communicates and from which it receives signals. In the method described herein, this device will be a transponder, a beacon or a responder which is attached to the outside of the receiver cable. A transponder answers a call from the measuring head, a beacon continuously transmits signals, while a responder transmits signals when it receives a message to do so via a cable (electrical impulses).

The hydroacoustic system will be connected to the vessel's gyrocompass 36, and the system must also comprise a vertical reference unit 37 so that the measurements are automatically corrected for rolling and pitching. It is crucial that the measured angles be referenced to the horizontal plane.

When the system for determining the positions of points 42 along the cable is in use (FIG. 6), the hydroacoustic super-short baseline system measures the angle between a line of reference 46, normally the vessel's centerline or a line parallel to this, and a line 43 of measurement to the point 42 on the receiver cable. The azimuth of the line of reference is known from the gyrocompass, and the azimuth 40 of the line 43 of measurement can therefore be determined.

The distance 43 from the transducer 41 to the measurement points 42 along the cable (transponder, beacon or responder) can be calculated on the basis of the time it takes for the signal to travel back and forth through the water. However, for longer distances, typically 1000 meters or more, the distance measurements may be somewhat inaccurate, because the beam path 44 may not travel on a straight line in the vertical plane owing to small vertical temperature gradients in the water, surface waves, and the like (FIG. 7a). The placement of the measurement points 42 along the cable will, however, be known, and one can therefore utilize this distance and the measured angle for calculating the position of the point. On a curved cable, this distance will deviate somewhat from a straight line. This can be compensated after the cable shape has been preliminarily determined, by using the temporary shape to calculate the difference between the arc and a straight line. The final shape of the cable can then be calculated.

When determining the position of seismic receiver cables, the transverse deviation of the cable from the planned course will be critical. With the moderate arc shapes the cable can assume, the deviation between an arc and a straight line will not be of critical importance.

The number of measuring points along the cable must be adapted according to the accuracy one requires for the final determination of position of the receiver cable. The number also has to be adjusted in light of one's practical experience with the method. It should be assumed, however, that four to eight measurement points 42 distributed along the length of the receiver cable will be a typical number.

After the position of the measuring points 42 has been determined, the shape of the cable can be approximated by a mathematical curve. The boundary conditions for the mathematical curve will be that it has its point of origin at the tow point 45 on the vessel, and it passes through the measuring points 42 that are determined by the polar hydroacoustic measurement method. In its simplest form, the curve may consist of a series of straight lines from one measuring point 42 to the next. The first line will extend from the cable's tow point 45 (FIG. 6) to the first measuring point 42.

Normally, the individual user will select a mathematical curve through the position-determined measuring points 42 which corresponds to the user's idea of the cable shape. The method of the invention does not take into account which mathematical curve is utilized, but only how the position of the measuring points 42 along the cable, which are used to calculate the mathematical curve, are determined.

Calibration of the system to arrive at the correct azimuth is critical. The components used to determine the azimuth are the gyrocompass 14 and the hydroacoustic super-short baseline system.

The gyrocompass 14 must show the correct values for two reasons: first, to enable one to determine the position of points on the vessel relative to the navigation antenna 13 (see FIG. 2), and second, to determine the azimuth 39 of the line of reference (see FIG. 6).

The hydroacoustic measuring system must be calibrated to measure an angle of 0 degrees along the line of reference 46.

A simple, accurate and efficient method of calibration is to position the vessel alongside a wharf 47 in quiet waters, FIG. 7b. The vessel must be ballasted so that it does not list. The vessel's centerline must be determined and marked 48 on the deck/hull both fore and aft. Based on fixed geodesic markers 49 on land and utilizing land surveying techniques, one can then determine geographical coordinates for the points 48, and the centerline's azimuth 50 can be determined. Deviation from the determined azimuth and gyro can now be computed, and the gyro corrected, optionally including in the correction the algorithm calculations for the hydroacoustic polar measurement method.

The hydroacoustic super-short baseline system's angular measurements can be calibrated by suspending a transponder 51 from another boat located at least 800 meters (minimum) from the seismic vessel. Utilizing land surveying techniques, the position of the transponder 51 is determined, and the azimuth 52 for the measurement line from the seismic vessel to the transponder 51 can be determined. The difference between this azimuth 52 and the vessel's azimuth 50 should now be equal to the angle 53 measured with the hydroacoustic system. Alternately, this angle 53 can be determined directly by theodolitic measurement from the vessel. No matter what method is used, several measurements must be made with the transponder 51 located in many directions behind the seismic vessel.

It was stated above that the measurement point 42 on the cable can be a transponder, beacon or responder. Ideally, the measuring point 42 should be a responder that is controlled by the hydroacoustic measuring system via electrical cables through the receiver cable and an electromagnetic connection to the responder. With this method, one is dependent only on one-way signal transmission through the water, which reduces the possibility that noise may affect the accuracy of the measurements. Furthermore, the responder method makes it possible to measure distance.

The responder method requires the installation of special connectors via the seismic receiver cable, and for practical reasons, therefore, the use of a responder may not always be possible. One can then use a transponder or a beacon. Transponders must receive the signal through the water from transducers on the vessel. Because the signal must travel both to and from the transponder, the risk that noise may affect the measurement accuracy increases over longer distances, such as toward the end of the seismic receiver cable. As mentioned previously, transponders give one the possibility of determining distances.

The beacon method has the same advantage as the responder - one-way transmission. However, the signal transmission cannot be controlled, so that under unfavorable conditions one may lose the measurement because the signals from several beacons may arrive at the transducer simultaneously. The beacon method does not allow the possibility of determining distances, and the distances as determined by the installation of beacons along the cable must be used.

The best hydroacoustic super-short baseline system available on the market today has an angle measuring accuracy of ±0.5 degree. Assuming that the accuracy of the gyrocompass 14 is ±0.5 degree, and the calibration accuracy is ±0.2 degree, and that the errors are of random nature, the angular accuracy of the system will be:

$$\sqrt{0.5^2 + 0.5^2 + 0.2^2} = \pm 0.7 \text{ degree}$$

FIG. 8 shows that the transverse errors 54 on the receiver cable will be proportional to the distance to the seismic vessel. The table below shows the effect of a ±0.7 degree error at various distances:

| Distance | Transverse error |
| --- | --- |
| 500 meters | 6 meters |
| 1000 meters | 12 meters |
| 1500 meters | 18 meters |
| 2000 meters | 24 meters |
| 2500 meters | 30 meters |

Assuming that the shape of the receiver cable does not vary drastically from one seismic shot to the next about 10 seconds later, these values can possibly be improved by filtration and statistical analysis of the measurement results.

With the hydroacoustic polar measurement method, the positions of single points on the receiver cable are measured directly. To determine the position of each group of hydrophones on the receiver cable, one must approximate the cable's shape by a mathematical curve, but the boundary conditions for this curve will be that it must pass through known, given positions. This will result in more reliable determination of position and a significantly more reliable estimate of the accuracy. In all such determinations of position, one is operating within certain tolerances, and it is of great importance for an evaluation of the final accuracy of a total system that one can arrive at a reliable estimate of the margin of error for each individual component.

With the hydroacoustic polar method, one is not dependent on the magnetic field and other external influences. The system can be calibrated while the vessel is docked in a protected body of water so that the calibration uncertainty is kept to a minimum.

The method in accordance with the present invention requires the use only of equipment that is mounted on the vessel and the receiver cable. Other acoustic measuring methods could perhaps also be used, for example the long-baseline method, but require installation on the sea bed of a network of transponders (transmitter-receivers) which communicate with installations on the receiver cable and on the vessel. A system of this type will be more cumbersome to operate, and there is a certain risk that the transponders might be moved into different positions due to trawler activity in the area, for instance.

The hydroacoustic polar measurement method has one limitation: At special temperature conditions in the water, temperature strata may arise which cause the acoustic beam to bend in such a way that the hydroacoustic communication between the vessel and the installations along the cable is broken. One should therefore measure the temperature in the region of operation prior to beginning the measurements, to determine whether such unfavorable temperature strata are present.

I claim:

1. A method for determining a position of a marine seismic receiver cable adapted to be towed through a sea behind a seismic vessel comprising:
    (a) providing a towing cable extending directly behind the vessel, in a substantially horizontal manner, a distance which is significantly greater than a depth to which the cable descends;
    (b) generating measured values by measuring an azimuth and a distance from the vessel to a plurality of points having coordinates along the seismic receiver cable using a super-short baseline hydroacoustic measuring system, and (c) calculating the coordinates of the points utilizing the measured values.

2. The method of claim 1, wherein said super-short baseline hydroacoustic measuring system includes obtaining the azimuth of each point by measuring the azimuth of a reference line on the vessel and measuring an angle formed by a line of said reference line and a straight line to the respective point on the cable and adding the so-measured angle to the so-measured azimuth.

3. The method of claim 2 including providing a gyrocompass on the vessel and signal-generating means to the cable, and obtaining the said angles therefor.

* * * * *